…

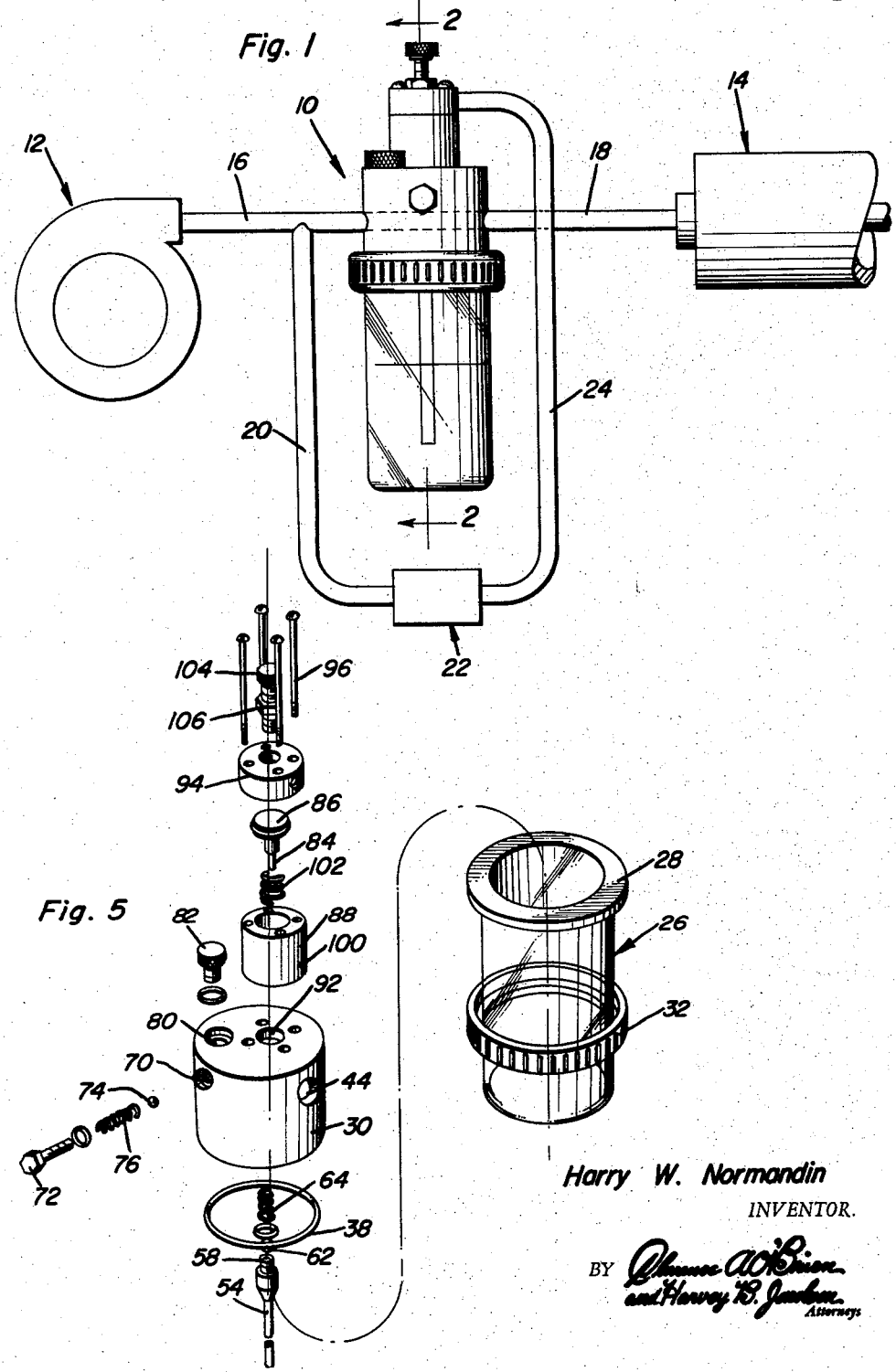

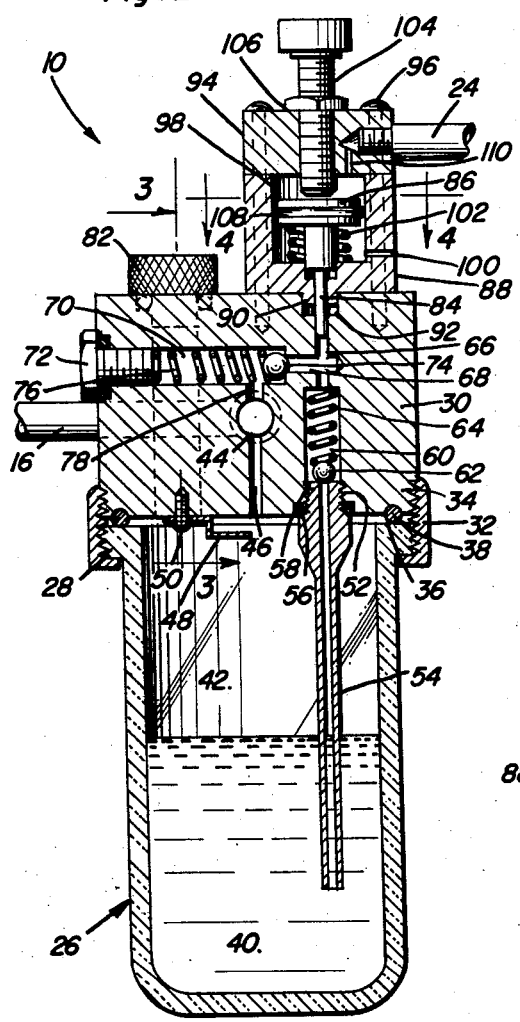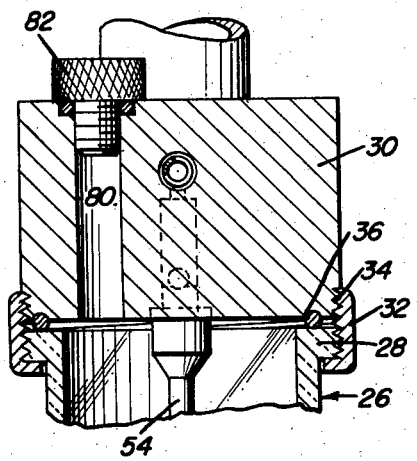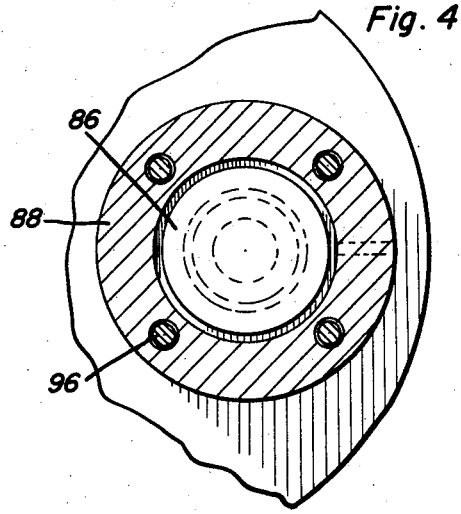
Harry W. Normandin
INVENTOR.

United States Patent Office 3,143,188
Patented Aug. 4, 1964

3,143,188
AIR LINE LUBRICATOR
Harry W. Normandin, Detroit, Mich., assignor to Abington Machine Company, Detroit, Mich., a co-partnership
Filed June 12, 1963, Ser. No. 287,422
3 Claims. (Cl. 184—55)

This invention relates to a device for supplying metered amounts of an incompressible fluid such as lubricating oil of a low viscosity type into the fluid supply line for a fluid operated device.

In particular, the present invention is concerned with the supply of metered amounts of lubricating oil by a lubricator device to the air pressure line which supplies a fluid operated device. It is therefore a primary object of the present invention to provide a lubricator device which is more positively operative to supply metered amounts of relatively low viscosity lubricating fluids to an air line for lubrication of an air operated device without reliance on air pressure differential.

Another object of the present inventon is to provide a lubricator which may be readily adjusted for varying the metered supply of lubricating oil to an air line without involving any needle valve adjustment or passage restriction adjustments. A more efficiently operative lubricator is thereby realized.

In accordance with the foregoing objects, the lubricator device of the present invention involves the pressurization of the lubricating oil within an oil storage bowl by the line pressure. The lubricating fluid so pressurized maintains a metering chamber within the lubricator valve body filled with lubricating fluid so that intermittent supply of air line pressure to an ejector piston will positively displace a predetermined volume of the lubricating fluid from the metering chamber into the air line passage. It will therefore become apparent, that a predetermined volume of lubricating fluid will be displaced into the air line passage without regard to the actual static pressure of the air line or its flow velocity. The lubricator has therefore been found to be significantly more efficient in connection with low viscosity fluids such as machine oil and lubricating oils.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the lubricating device in one typical diagrammatically illustrated installation.

FIGURE 2 is a side sectional view of the lubricator taken substantially through a plane indicated by section line 2—2 in FIGURE 1.

FIGURE 3 is a partial sectional view taken substantially through a plane indicated by section line 3—3 in FIGURE 2.

FIGURE 4 is a transverse sectional view taken substantially through a plane indicated by section line 4—4 in FIGURE 2.

FIGURE 5 is a perspective view of the disassembled parts of the lubricator.

Referring now to the drawings in detail, it will be observed from FIGURE 1 that the lubricator generally referred to by reference numeral 10 may be connected between any source of air under pressure such as the pressure source 12 diagrammatically illustrated in FIGURE 1 and a fluid operated device such as the cylinder device 14. Accordingly, the source of air pressure is connected by the conduit 16 to one side of the lubricator so that the airstream may pass therethrough and be supplied to the cylinder device 14 by the conduit 18. Connected to the conduit 16 by means of the line 20, is an intermittently operated valve device 22 by means of which the intermittent pressure supply tube 24 will supply air under pressure to the lubricator for operation thereof.

Referring now to FIGURE 2 in particular, it will be observed that the lubricator device 10 includes lubricating fluid storage means in the form of an oil supply bowl 26 the upper end of which is provided with an annular flange portion 28. The oil supply bowl 26 is thereby secured to a valve body 30 by means of an internally threaded retainer ring 32 which threadedly engages an externally threaded portion 34 of the valve body so as to axially clamp the flange portion 28 of the oil supply bowl to the valve body. The lower end of the valve body is therefore provided with an annular recess 36 receiving a sealing ring 38 which bears against the annular flange portion 28 in order to seal the valve body to the storage bowl 26. It will therefore be apparent, that a supply of a low viscosity, relatively incompressible fluid 40 may be stored within the bowl 26 and maintained under a static pressure to which the chamber 42 is exposed. Accordingly the valve body 30 is provided with an air line passage 44 to which the conduits 16 and 18 are connected. The passage 44 will therefore conduct the main airflow stream being supplied to the air operated cylinder device 14. Formed within the valve body, is an air pressure passage 46 by means of which the chamber 42 is maintained under a static pressure equal to that of the main airstream. A deflector element 48 is therefore secured by the fastener 50 to the bottom of the valve body and projects into the chamber 42 in spaced adjacency below the lower outlet end of the air pressure passage 46.

The valve body 30 is provided with an internally threaded recess 52 adapted to receive therewithin the upper end of an oil supply tube 54. A sealing ring 56 is seated within the valve body in sealing relation about the threaded end portion 58 of the supply tube 54. The supply tube extends into the fluid 40 whereby the static pressure within the chamber 42 will force the fluid upwardly through the supply tube into an ejection chamber 60 formed within the valve body.

Mounted within the ejection chamber 60, is an inlet valve 62 in the form of a one-way ball valve element biased to a closed position by the spring 64 seated within the ejection chamber. It will therefore be apparent, that when the pressure within the ejection chamber is reduced below that of the air line pressure existing in the storage chamber 42, the inlet valve 62 will open so as to admit fluid 40 into the ejection chamber until the pressure therein approaches that of the air line pressure whereupon the inlet valve closes. The ejection chamber 60 is axially aligned with a metering passage 66 which is intersected by an outlet passage 68. The outlet passage is in turn connected with an outlet chamber 70 formed within the valve body and adapted to be closed at one end by a threaded plug element 72. Fluid communication is established between the outlet passage 68 and the outlet chamber 70 upon opening of an outlet valve element 74 which is biased to a closed position by the spring 76 seated within the outlet chamber 70. The outlet chamber 70 communicates with the air line passage 44 extending through the valve body by means of a connecting passage 78. It will therefore be apparent, that when the pressure within the ejection chamber 60 exceeds the air line pressure existing within the outlet chamber 70, the outlet valve 74 will be forced open so that the lubricating fluid 40 maintained within the ejection chamber, will be ejected into the air line passage for supply to the air operated cylinder device as hereinbefore indicated. Lubricating fluid 40 will therefore be maintained within the ejection chamber and passages 66 and 68 substantially under a static pressure equal to that of the air line pressure. Metered quantities of the lubricating fluid will therefore be ejected through the outlet valve 74 and supplied to the ejection chamber thorugh the inlet valve 62. The valve body 30 is therefore provided with a filler passage 80 through which the supply bowl 26 may be refilled with lubricating fluid as more clearly seen in FIGURE 3. The filler passage 80 is therefore closed by a sealed filler plug 82 so as to maintain the static pressure within the chamber 42.

In order to cause ejection or displacement of a metered amount of lubricating fluid from the ejection chamber 60 into the outlet chamber 70 for supply to the air line passage 44, an ejector plunger 84 extends into the metering passage 66 so that upon movement of the ejector plunger 84 in opposite directions, the volume of the ejection chamber and passages 66 and 68 connected thereto, may be varied. The ejection plunger is therefore connected to a piston member 86 reciprocally mounted within a cylinder member 88. The lower end of the cylinder member is closed and provided with a central projection 90 adapted to be received within a recess 92 formed in the valve body in axial alignment with the passage 66 and the ejection chamber 60. Accordingly, a bore is formed in the bottom of the cylinder through which the ejection plunger 84 extends so that it may project into the passage 66 in the valve body when the cylinder member is seated thereon. An adjustment head member 94 closes the upper end of the cylinder member and is secured in assembled relation with the cylinder member on the valve body by means of a plurality of assembly bolts 96. The head member 94 thereby encloses a pressure chamber 98 on the upper side of the piston 86 while the underside of the piston within the cylinder member is vented by the vent passage 100. A return spring 102 is also mounted within the cylinder member and biases the piston 86 in an upward direction toward the end of an upward stroke limited by adjustable positioning of a stroke-limiting screw member 104 mounted in the head member 94. The stroke-limiting screw member 104 is therefore locked in adjusted position by the locknut 106 and will limit the travel of the piston 86. Air under pressure is therefore supplied to the pressure chamber 98 which is sealed from the vented chamber below the piston by means of the sealing ring 108. Accordingly, the intermittent pressure supply tube 24 is connected by the passage 110 to the pressure chamber 98 so that when air pressure is supplied to the chamber, the piston 86 will be displaced downwardly to the end of its stroke against the bias of the spring 102. When the air pressure supply to chamber 98 is cut off, the return spring 102 will move the piston back to its upper end of the stroke. The amount of travel of the piston 86 will therefore determine the variation in volume produced by movement of the ejector plunger 84 connected to the piston.

From the foregoing description, the construction, operation and utility of the lubricator device of the present invention will be apparent. It will therefore be appreciated, that the storage chamber 42 will be maintained at the same static pressure as that of the air line being supplied with metered quantites of lubricating fluid by the lubricating device 10. Accordingly, the pressure within the chamber 42 will be operative to displace the lubricating fluid upwardly through the supply tube 54 and open the inlet valve 62 to maintain the ejection chamber and passages connected thereto, filled with lubricating fluid as the ejector plunger 84 moves upwardly. The maximum amount of lubricating fluid received within the ejection chamber will therefore be determined by the setting of the stroke-limiting screw member 104. When the intermittent valve device 22 is opened, air under pressure will be supplied to the pressure chamber 98 so as to displace the ejector plunger 84 downwardly. The inlet valve 62 will thereby be maintained closed while the outlet valve 74 will be forced open so that lubricating fluid will be displaced into the outlet chamber 70. The foregoing operation of the lubricator will therefore be positive and efficient since it does not rely upon any differential pressure nor any needle valve adjustments or venturi flow action.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a source of pressure fluid and a fluid operated device supplied with a relatively compressible fluid under pressure from said source, means for supplying metered quantities of a relatively incompressible fluid comprising, storage means operatively connected to said source for maintaining a supply of said incompressible fluid under the static pressure of said compressible fluid, an ejection chamber adapted to be filled with a metered volume of said incompressible fluid, piston means displaceable through a predetermined stroke for varying the volume of said ejection chamber and pressure of the incompressible fluid therein, valve means responsive to said variation in pressure independently of the piston means for either admitting incompressible fluid from the storage means into the ejection chamber or discharging said incompressible fluid from the ejection chamber, said pressure responsive valve means comprising, a one-way outlet valve responsive to an increase in pressure in the ejection chamber when the volume thereof is being reduced for opening the ejection chamber to permit displacement of the fluid therefrom, and a one-way inlet valve responsive to a reduction in the pressure in the ejection chamber when the volume thereof is being increased for establishing fluid communication with the storage means, intermittently operative valve means operatively connecting said source to the piston means for itnermittent displacement thereof through said predetermined stroke.

2. The combination of claim 1, wherein said piston means comprises, an intermittent pressure chamber, a piston element reciprocably mounted in said pressure chamber, adjustable stroke-limiting means mounted in said pressure chamber for limiting the stroke of the piston element in one direction, spring means biasing the piston element in said one direction and an ejection plunger connected to said piston element and projecting into the ejection chamber for varying the volume thereof upon movement of the piston element.

3. In combination with a source of pressure fluid and a fluid operated device supplied with a relatively compressible fluid under pressure from said source, means for supplying metered quantities of a relatively incompressible fluid comprising, storage means operatively connected to said source for maintaining a supply of said incompressible fluid under the static pressure of said compressible fluid, intermittently operative valve means connected to the source, a valve body mounted on said storage means in sealing relation thereto, flow passage means extending through said valve body for conducting flow of said compressible fluid, static pressure passage means in said valve body and connected to said flow passage means for pressurization of the incompressible fluid in the storage means, said valve body having an ejection chamber formed therein, a supply tube mounted on the valve body and projecting into the incompressible fluid in the storage means, pressure responsive valve means for admitting said incompressible fluid into the ejection chamber from the supply tube when the pressure in the storage means exceeds the pressure in the ejection chamber, outlet valve means responsive to pressure in the ejection chamber in excess of the static pressure in the flow passage means for establishing fluid communication between the flow passage means and the ejection chamber, a cylinder member mounted on the valve body in alignment with the ejection chamber, a spirng-biased piston reciprocably mounted in said cylinder member, an ejection plunger connected to the piston and projecting into the ejection chamber, adjustable limit means mounted on the cylinder member for limiting the stroke of the piston to volumetrically regulate the displacement of incompressible fluid through the ejection chamber, and conduit means operatively connecting said intermittently operative valve means to the cylinder member for displacement of the piston through the predetermined stroke when pressurized.

References Cited in the file of this patent
UNITED STATES PATENTS

| | | |
|---|---|---|
| 1,558,221 | Bayles et al. | Oct. 20, 1925 |
| 1,721,231 | Osborne | July 16, 1929 |
| 1,864,536 | Hamerly | June 28, 1932 |
| 2,184,172 | Venable | Dec. 16, 1939 |